G., L. & G. J. A. FULLER.
ELECTRIC ACCUMULATOR.
APPLICATION FILED NOV. 27, 1915.

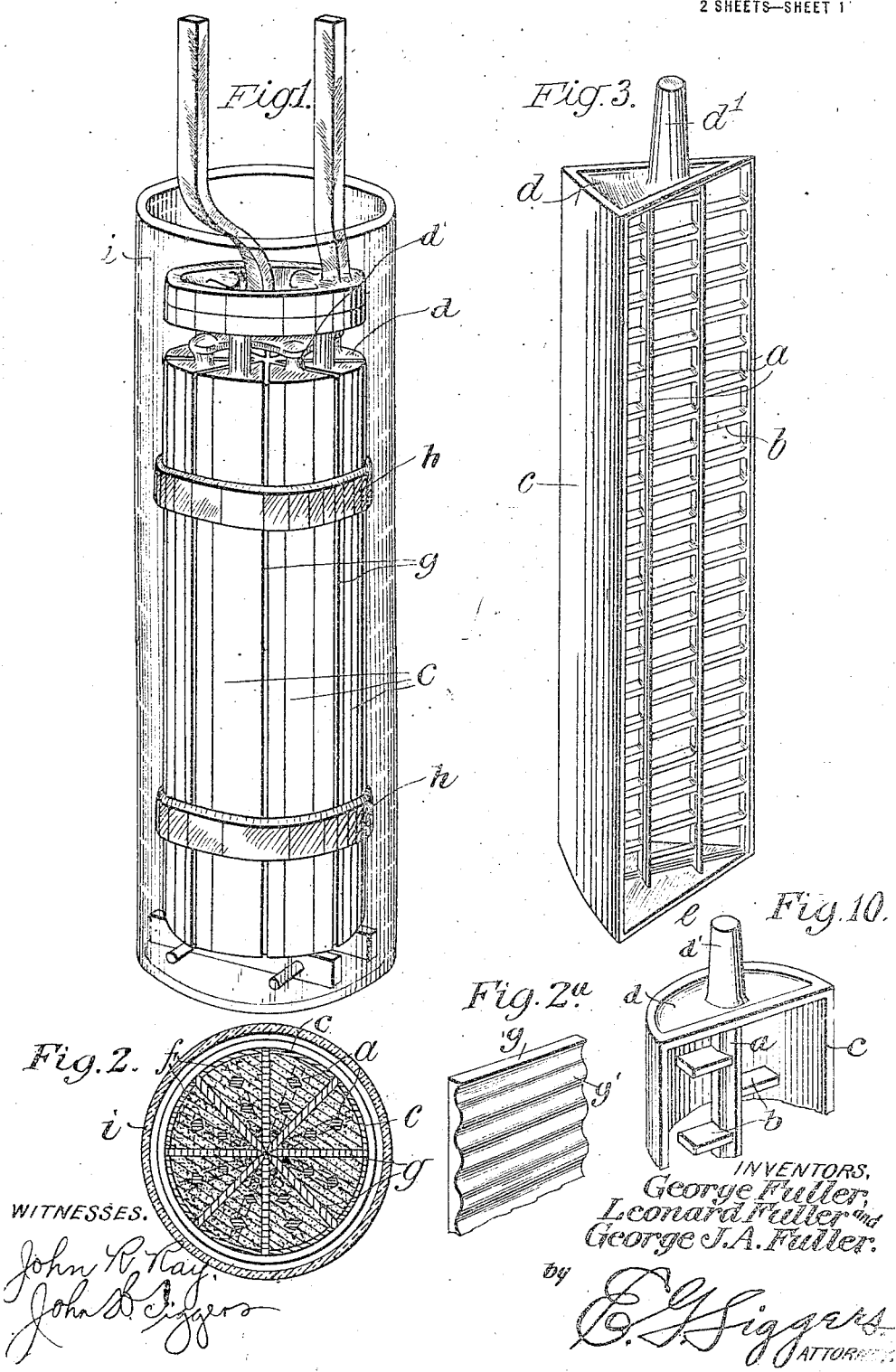

1,197,816.

Patented Sept. 12, 1916.
2 SHEETS—SHEET 2.

WITNESSES.
John R. Ray.
John S. Siggers

INVENTORS,
George Fuller
Leonard Fuller
and George J. A. Fuller,
by C. J. Siggers
ATTORNEY.

UNITED STATES PATENT OFFICE.

GEORGE FULLER, LEONARD FULLER, AND GEORGE JOHN ANDREW FULLER, OF BOW, LONDON, ENGLAND.

ELECTRIC ACCUMULATOR.

1,197,816.  Specification of Letters Patent.  Patented Sept. 12, 1916.

Application filed November 27, 1915. Serial No. 63,597.

*To all whom it may concern:*

Be it known that we, GEORGE FULLER, LEONARD FULLER, and GEORGE JOHN ANDREW FULLER, subjects of His Majesty the King of England, residing at Bow, in the county of London, Kingdom of England, have invented certain new and useful Improvements in and Connected with Electric Accumulators, of which the following is a specification.

This invention refers to improvements in and connected with electric accumulators or secondary storage batteries and it relates more particularly to those in which the electrodes are constructed in the form of blocks of triangular, trianguloid, or other section so that each unit forms a section of a rectangular or cylindrical cell.

The primary object of the present invention is to provide an improved and mechanically strong cell of this kind in which the active material of the electrode is so arranged on its support that when the cell is built up it is completely incased or externally armored with continuous or unperforated lead and its disintegration completely prevented owing to the manner in which it is supported.

The invention is hereinafter described with reference to the accompanying drawings in which:—

Figure 4:
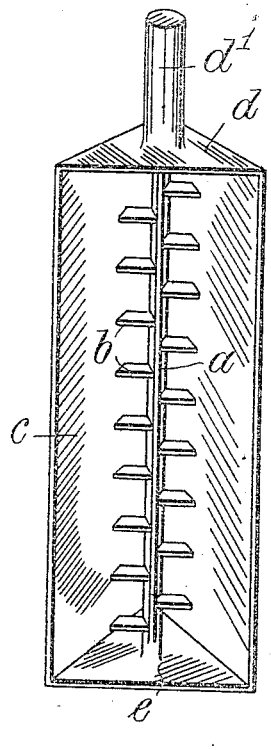
Figure 6:
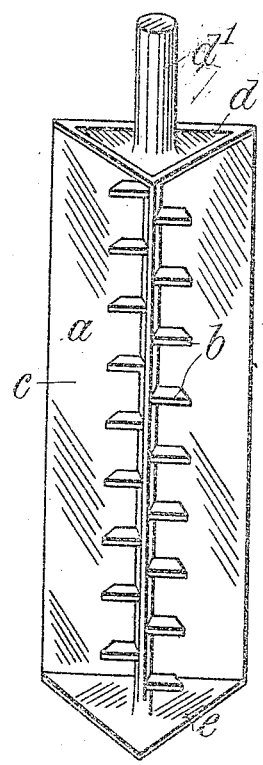
Figure 8:
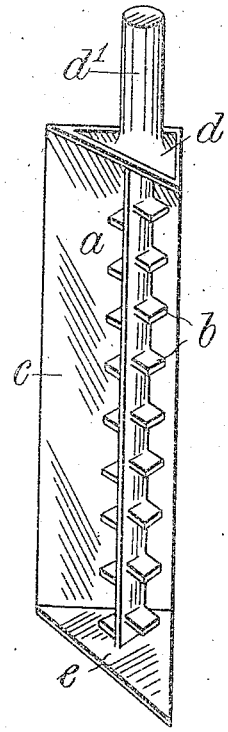
Figure 5:
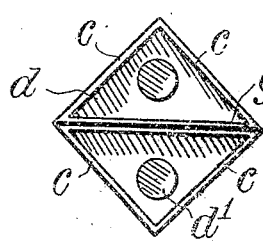
Figure 7:
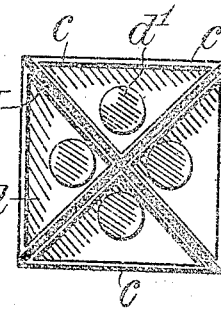
Figure 9:
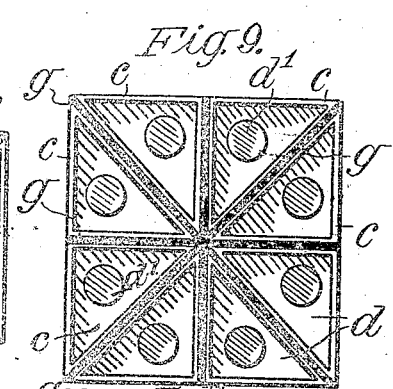

Figure 1 is a general perspective view of a cell showing a plurality of electrodes built up into a cylindrical form; Fig. 2 is a sectional plan view corresponding thereto; Fig. 2ª is a perspective view of a fragment of one of the insulating division plates; Fig. 3 is a perspective view of the metallic core of a segmental block electrode, corresponding to that employed in a cylindrical cell; Fig. 4 is a similar view of a triangular electrode such as would be employed in a cell having two electrodes; Fig. 5 is a plan view of such a two electrode cell; Figs. 6 and 7, and Figs. 8 and 9 are similar views to Figs. 4 and 5, showing triangular electrodes such as would be employed in a four and eight electrode cell respectively; Fig. 10 is a perspective view of a portion of a substantially semi-circular electrode.

In carrying out the present invention and referring generally to the various figures of the drawings it will be seen that each electrode or unit comprises an inner supporting core or grid $a\ b$ usually of lead, on to which the active material is pressed. Each core conveniently comprises a medially disposed grid or perforated strip formed of a longitudinal member or members $a$, with spaced cross pieces $b$ and connected with or adjacent to one edge of this grid is a flat or slightly curved continuous or unperforated casing or plate $c$ disposed to form and define the external surface of each electrode or unit when a plurality are assembled as shown. At each end of the core or grid $a\ b$ and the aforesaid plate are heads $d$ and $e$ which conform in shape to the cross sectional shape of the finished electrode and one of these heads, preferably the upper one $d$ is provided with a terminal lug $d'$ projecting therefrom. As will be understood the entire support including the grid $a\ b$, the plate $c$, the heads $d$ and $e$ and the terminal $d'$ may conveniently be cast in one piece of lead, especially antimonial lead, which is not materially affected by the charging and discharging of the cell. This support or core $a\ b$ forms a nucleus upon which the active material $f$, such as is usually employed in lead accumulators, is pressed so as to constitute a block electrode. In the construction shown in Figs. 1 to 3, and in Figs. 6 to 9 of the drawings, it will be seen that the block of active material $f$ tapers from the part of greatest thickness, the edges of the outside plate $c$, to the inner edge of the block which in the construction shown in Figs. 1 to 3, coincides with the inner edge of the medial grid $a$. In the constructions shown in Figs. 4 and 5, where the electrodes have two external faces protected by a plate $c$, the active material presents only one flat inner face which tapers from the part of greatest thickness, the edges of the said outside plate, to the outer corner or angle of the unit as shown. Thus it will be understood that the active material is in all cases well supported along its edges and is only visible upon its face or faces which are inside when the electrodes are assembled as shown to form a cell.

If desired, semi-circular electrodes $c$, one of which is shown in Fig. 10, may be provided which could be made to substantially resemble the constructions shown in Figs. 4 and 5 except that the two outer flat faces of lead would be formed of a single curved plate as will be readily understood.

The adjacent faces of active material of the block electrodes are insulated from each other when assembled by layers of porous or other suitable material of a character capable of resisting the acid of the electrolyte employed in the cell. Such layers may take the form of strips or plates *g* of wood having one side ribbed or corrugated, as shown at *g'*, Fig. 2ª, and the other plain, the ribbed sides of which may conveniently be turned toward the negative electrodes so as to permit free access of the electrolyte to these surfaces. By this means all possibility of the peroxid or other active material getting dislodged and falling to the bottom of the cell is prevented as it is adequately supported even on its exposed surfaces.

Before placing the assembled electrodes into their cell *i*, Fig. 1, they may, where required, and as shown in Figs. 1 and 2 be bound tightly together by means of a plurality of bands of insulating material for example insulated lead, celluloid, rubber or ebonite rings *h* which pass around the outer lead armored faces *c* of the separate blocks.

It will thus be manifest that the improved block electrodes may be fitted together to provide an extremely strong mechanical whole, which can be subjected to rough handling and which even when left in inexperienced hands may be short circuited or even reversed or allowed to stand idle in a discharged state without appreciable deterioration, as the electrodes cannot buckle or disintegrate owing to their construction and the complete manner in which they are armored and the active material supported in place.

What we claim as new and desire to secure by Letters Patent of the United States is:—

1. A storage battery electrode of sectional block form, having an interior metallic support, a mass of active material surrounding and embedding the support, and outstanding therefrom, and a continuous wall of lead covering a portion of the surface of the mass of active material with the remainder of said surface exposed, whereby a plurality of electrodes may be assembled into the form of a compact geometric solid with the exposed walls of active material of the different electrodes in close face to face relation and the continuous lead walls individual to the electrodes outermost and constituting an exterior support for the active material between the latter and surrounding electrolyte, thus avoiding exterior wrappings.

2. A storage battery electrode of sectional block form including a mass of active material with the electrode shaped for assemblage with other electrodes into a compact geometric solid, the electrode having a lead wall constituting the outer wall in the assemblage of electrodes, and also constituting a support for the active material between the latter and the electrode exterior thereto, whereby external wrappings for the assembled electrodes are avoided.

3. A storage battery comprising a plurality of electrodes of block form each representing a geometric section of a geometric solid and assembled around a longitudinal center line in close face to face relation with interposed insulation between said faces, and each electrode having that face directed away from the center line of the assembled electrodes provided with a wall of lead individual to the electrode and together with the like lead walls of the other electrodes constituting a practically continuous lead wall inclosing the electrodes and having its continuity broken solely along the lines of division and separation of the electrodes, whereby external wrappings for the assembled electrodes are avoided.

4. A storage battery comprising a suitable container, a plurality of electrodes therein grouped about a common center and separate from the walls of the container, each electrode consisting of an inner core having laterally extended terminal heads and an outer wall of lead connecting the outer edges of the heads, and a mass of active material embedding the core and extending laterally therefrom to the lead wall and the other edges of the heads, the surface of the active material being exposed except where covered by the lead wall and said exposed surfaces being arranged in close spaced face to face relation to the corresponding surfaces of the neighboring electrode or electrodes, each electrode corresponding in shape to the others and being in the form of a block constituting a regular section of a geometric solid defined by the assembled electrodes, and exterior binding means for holding the electrodes in the assembled condition against relative displacement.

In testimony whereof we have hereunto signed our names to this specification.

GEORGE FULLER.
LEONARD FULLER.
GEORGE JOHN ANDREW FULLER.